United States Patent [19]
Lipschultz et al.

[11] Patent Number: 4,759,844
[45] Date of Patent: Jul. 26, 1988

[54] PORTABLE WATER PURIFICATION SYSTEM

[75] Inventors: Mitchell Lipschultz, Ft. Lauderdale; Alfred J. Liptschultz, Coconut Creek, both of Fla.

[73] Assignee: Aquathin Corp., Ft. Lauderdale, Fla.

[21] Appl. No.: 842,165

[22] Filed: Mar. 21, 1986

[51] Int. Cl.$^4$ .................................. C02F 9/00
[52] U.S. Cl. .................. 210/257.2; 210/259; 210/266; 210/282; 210/284
[58] Field of Search ........ 210/638, 663, 669, 681–688, 210/694, 900, 241, 266, 282, 284, 321.1, 257.2, 259

[56] References Cited

U.S. PATENT DOCUMENTS

| | | | |
|---|---|---|---|
| 3,870,033 | 3/1975 | Faylor et al. | 210/900 |
| 4,160,727 | 7/1979 | Harris | 210/900 |
| 4,196,081 | 4/1980 | Pavia | 210/284 |
| 4,383,920 | 5/1983 | Muller et al. | 210/284 |
| 4,416,775 | 11/1983 | Halbich et al. | 210/282 |
| 4,548,716 | 10/1985 | Boeve | 210/669 |

*Primary Examiner*—Ivars Cintins
*Attorney, Agent, or Firm*—Charles E. Baxley

[57] ABSTRACT

An apparatus for purifying drinking water by a combination of reverses osmosis, deionization by ion exchange resins, resin and final passage through activated carbon. The components for reverse osmosis, de-ionization, and passage through active carbon, and a product water reservoir are housed in a cabinet suitable for placement in a home. Ionic impurities are removed by reverse osmosis through a cellulose acetate membrane which feeds the flux water to a mixed resin bed for deionization. Waste brine is removed from the reverse osmosis module by controlled leakage to maintain concentration at a low level. The product water is filtered through a cartridge of granular activated carbon prior to being stored in a product water reservoir. An attachment is connectable with the tap water faucet to provide tap water to the unit at main water supply pressure and to dispose of waste brine water and excess product water. Components are replaceable and available on the market.

1 Claim, 1 Drawing Sheet

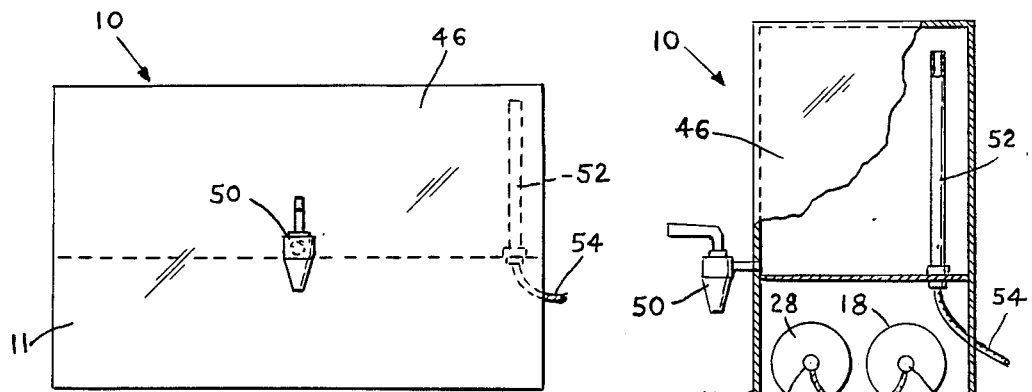
FIG. 1
FIG. 2
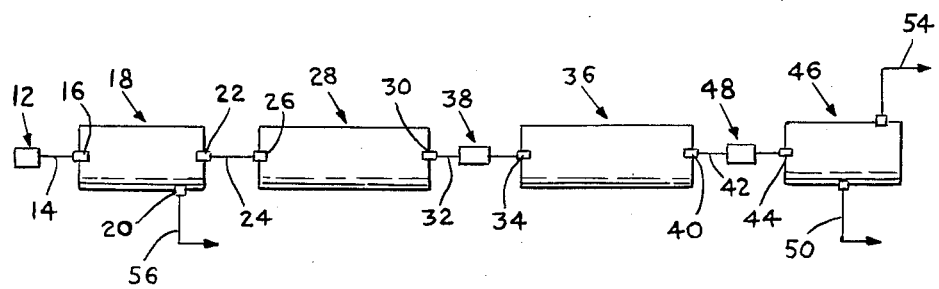
FIG. 3
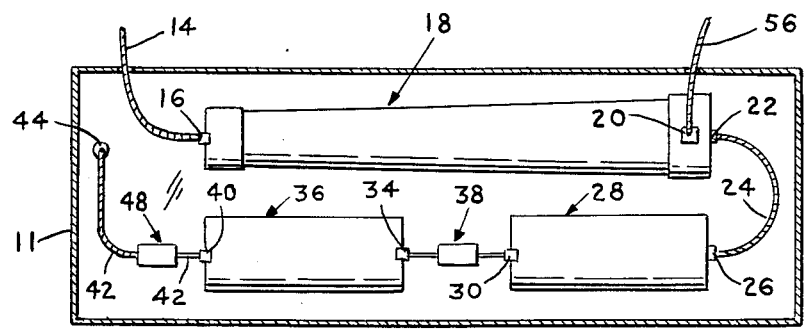
FIG. 4

)# PORTABLE WATER PURIFICATION SYSTEM

This invention relates to water purification systems. It relates particularly to small, compact, portable water purification systems which are suitable for use in most households.

BACKGROUND OF THE INVENTION

It is well recognized that water for drinking purposes must be relatively pure to avoid health problems. It is also well known from medical and other scientific studies that health is improved and maintained by drinking water from which undesirable salts and minerals have been removed. Water purification units, now on the market for use in households, utilize active carbon (e.g. charcoal) both as a filter and an adsorbent to remove impurities. Although charcoal will serve to remove by filtration particles suspended in the water and adsorb odoriferous materials contained in the water, the charcoal is of practically no use in removing most ionic substances (e.g. various salts) dissolved in the water.

Other means for purifying water involve use of reverse osmosis, as shown and described, for example, in U.S. Pat. Nos. 3,505,215; 3,746,640; 4,083,780; 4,156,621; 4,161,445 and 4,206,048, and ionic exchange resins, as shown and described, for example, in U.S. Pat. Nos. 3,431,201; 3,928,192; 4,083,782; 4,200,695; 4,219,414; 4,302,548; 4,334,949 and 4,349,442. Some of these patents, e.g., U.S. Pat. Nos. 3,431,201; 4,161,445 and 4,206,408 show use in combination of reverse osmosis and ion exchange to purify water.

The systems described in the above-mentioned patents are designed for large scale use and usually require an external source of power, such as electricity, to pump the water through the system. These systems are not only very sophisticated but are expensive to construct and operate making them unsuitable for small scale use in households.

THE PRESENT INVENTION

It is, accordingly, an object of this invention to provide a water purification unit that operates solely on the pressure of the water in the water line in households and does not require an external source of power.

It is another object of this invention to provide a water purification unit which is small enough to be placed on a counter top in the home.

It is a further object of this invention to provide a water purification unit which is inexpensive to construct and install.

It is still another object of this invention to provide a water purification unit in which the various purification units are in the form of cartridges which are readily replaceable, easy to install and inexpensive.

It is still another object of this invention to provide a water purification unit of sufficient capacity to supply the needs of a family of four (4) without requiring frequent replacement of the various purification means.

It is still another object of this invention to provide a water purification unit which will remove efficiently undesirable suspended matter, odoriferous substances and dissolved ions from the water.

Other objects will appear from the description which follows.

In accordance with this invention there is provided a water purification system comprised of a reverse osmosis unit, an ion exchange unit, an activated carbon unit, and a reservoir. Each unit, including the reservoir is provided with inlets, outlets, the inlet of the reverse osmosis unit being in fluid communication with an outlet of the water supply, the inlet of the ion exchange unit being in fluid communication with the outlet of the reverse osmosis unit, the inlet of the active carbon unit being in fluid communication with the outlet of the ion exchange unit, and the inlet of the reservoir being in fluid communication with the outlet of the active carbon unit, the fluid communication means (hereinafter referred to as lines) being plastic tubing. The units and reservoir also are fabricated from suitable plastics. The reverse osmosis unit also is provided with an outlet for removing the brine water, the description generally applied to the water containing a higher concentration of undesirable ions. The reservoir is provided with overflow means. A filter is placed in the line joining the ion exchange unit and the active carbon unit and another filter is placed in the line joining the active carbon unit and the reservoir.

The invention will become clearer from the drawings and the description which follows. It is to be understood that the drawings and description are given only for purposes of illustration and are not to be considered as limiting.

In the drawings:

FIG. 1 is a frontal elevational view of the housing;

FIG. 2 is a side sectional elevational view of the unit with the side panel removed;

FIG. 3 is a schematic representation of the system; and

FIG. 4 is a frontal sectional view of the unit with the front panel removed.

Referring now to the drawings, the water purification unit is shown generally as numeral 10. The housing 11 is a durable plastic unit holding the active units in a storage compartment. The housing 11 is of suitable size to be placed on a counter top. A suitable unit is approximately 11 ¾" high, 19¼" wide and 7" deep. Feed 12 connects to the water faucet, not shown, to provide tap water at system pressure of approximately 20-60 p.s.i. Feed 12 is connected by line 14 to the inlet 16 of the reverse osmosis unit 18. The reverse osmosis unit 18 contains a cellulose acetate spiral wrap reverse osmosis membrane (not shown) which is commercially available. A representative membrane would consist of approximately 8.3 square feet and has a flux rate of 10.66 GPD when water pressure of 60 p.s.i. is applied. The brine to permeate ratio is 7 to 1. The operation of reverse osmosis spiral wrap membranes is well known and will not be elaborated on here except to say that there is a feed fluid passageway through which feed fluid under pressure flows part of the membrane sheets; product fluid, which is the result of the ultrafiltration, flows through the membrane sheets into the product passageway and spirals inwardly to the central mandrel where it is ejected. The remaining feed fluid is released through the outlet 20 for ejection through line 56 thereby eliminating any elaborate plumbing installation. The filtered flux water passes through outlet 22, line 24 and the inlet 26 into the ion exchange unit 28. The lines joining the various units are ¼ inch plastic tubing. Use of plastic prevents ionic reaction with the flux water, provides for durability of the unit and reduces cost of construction. The flux water passes through the ionic exchange unit 28 for deionization of the flux water. This unit 28 is a cylindrical cartridge containing approximately 30 ounces of mixed cationic and anionic resin, commercially available through Aquathin Corp. The water then passes through outlet 30, line 32, and inlet 34 into the active carbon unit 36. To avoid mixing of any resin with the active carbon an 8 micron cellulose fiber filter 38 is held in line 32. The water then passes through outlet 40, line 42 and inlet 44 into the reservoir 46. Another cellulose fiber filter 48 is held in line 48 to prevent any active carbon from entering the reservoir. The reservoir 46 is in the upper portion of housing 11 and has a capacity of approximately 3 gallons. The reservoir has a tap 50 for dispensing the purified water. In the upper portion of the reservoir is an overflow port 52 which leads to line 54 to provide for overflow of excess flux water without the need for additional plumbing or installation. The unit 10 is a portable unit which may be moved and only requires water pressure of approximately 20 p.s.i. to operate. Repair and replacement of components is facilitated by the mobility of the unit.

To avoid loose and flopping lines, lines 54 and 56 as well as line 14 may be held together by a coupler-not shown.

We claim:

1. A miniature portable domestic water purifying system adapted to operate under conventional water main pressure on a countertop for dispensing purified water, the system comprising in combination:

a housing provided with an upper reservoir for purified water and a lower process compartment, a reverse osmosis unit in the form of a replaceable cartridge and positioned in the process compartment, an ion exchange unit in the form of a replaceable cartridge and positioned in the process compartment, an activated carbon filter in the form of a replaceable cartridge and positioned in the process compartment, each of the reservoir and the reverse osmosis unit and the ion exchange unit and the activated carbon filter provided with an inlet and an outlet, water communication means connected between:
 (i) the water supply and the inlet of the reverse osmosis unit, and between
 (ii) the outlet of the reverse osmosis unit and the inlet of the ion exchange unit, and between
 (iii) the outlet of the ion exchange unit and the inlet of the activated carbon unit, and between
 (iv) the outlet of the activated carbon filter and the inlet of the reservoir, the reservoir provided with a tap and an overflow port, the reverse osmosis unit provided with an additional outlet for disposal of waste brine therefrom.

* * * * *

UNITED STATES PATENT AND TRADEMARK OFFICE
CERTIFICATE OF CORRECTION

PATENT NO. : 4,759,844
DATED : July 26, 1988
INVENTOR(S) : Mitchell Lipshultz, Alfred J. Lipshultz It is certified that error appears in the above-identified patent and that said Letters Patent are hereby corrected as shown below:

On the title page

In the heading, in item [75], the family name is

[MITCHELL LIPSCHULTZ] and [ALFRED J. LIPTSCHULTZ].

It should be spelled LIPSHULTZ in both cases.

Signed and Sealed this

Sixth Day of December, 1988

Attest:

DONALD J. QUIGG

Attesting Officer

Commissioner of Patents and Trademarks